United States Patent [19]

Nakatani

[11] 4,001,095

[45] Jan. 4, 1977

[54] METHOD OF DISCOLORATION OF METAL COMPOUNDS BY IRRADIATION OF LASER RAYS

[75] Inventor: Eisaku Nakatani, Hiratsuka, Japan

[73] Assignee: Kansai Paint Company, Ltd., Amagasaki, Japan

[22] Filed: May 15, 1975

[21] Appl. No.: 577,929

Related U.S. Application Data

[63] Continuation-in-part of Ser. No. 421,735, Dec. 4, 1973, abandoned.

[30] Foreign Application Priority Data

Dec. 11, 1972 Japan ........................... 47-123377

[52] U.S. Cl. .................. 204/157.1 R; 204/DIG. 11

[51] Int. Cl.² ........................................... B01J 1/10

[58] Field of Search .............. 204/157.1 R, DIG. 11

[56] References Cited

OTHER PUBLICATIONS

Anschel, IBM Technical Disclosure Bulletin, vol. 15, No. 2 (July 1972) pp. 603–604.

Martin, et al., Thin Solid Films, vol. 2 (1968) pp. 253–269.

*Primary Examiner*—Howard S. Williams

*Attorney, Agent, or Firm*—Flynn & Frishauf

[57] ABSTRACT

When laser rays are radiated on metallic compounds sucn as oxides, hydroxides, sulfides, carbonates, chromates and titanates, colors of these metallic compounds can be changed at high speeds. By application of this discoloration technique, it is made possible to cause discoloration selectively even at very minute areas of molded articles of these metallic compounds. Therefore, this technique can be applied advantageously and effectivey to recording, image reproduction and formation of electric circuits. If these metallic compounds especially oxides, are made semiconductors prior to irradiation of laser rays, the discoloration effects can be greatly enhanced. In conducting this method, laser rays having a wavelength from the visible to infrared region can be effectively employed.

9 Claims, No Drawings

METHOD OF DISCOLORATION OF METAL COMPOUNDS BY IRRADIATION OF LASER RAYS

RELATED APPLICATION

This application is a continuation-in-part of application Ser. No. 421,735, filed Dec. 4, 1973, now abandoned.

BACKGROUND OF THE INVENTION

This invention relates to a method of discoloration of metallic compounds which comprises irradiating laser rays on a metallic compound selected from the group consisting of oxides, hydroxides, sulfides, carbonates, chromates and titanates of metal elements.

In general, metallic compounds, especially inorganic metal compounds such as oxides and sulfides, are so stable that even when they are allowed to stand still in air maintained at room temperature, no change in the composition is brought about by decomposition or reduction and therefore, no discoloration occurs in these metallic compounds.

Methods for discoloring specific areas of a molded article of a metallic compound have heretofore been proposed. For instance, the specification of U.S. Pat. No. 3,138,547 teaches a method comprising passing an electric current to a metallic compound, for example zinc oxide, to which semi-conductivity is given, to thereby cause discoloration in the metallic compound as a result of reduction of such metal compound.

However, this method is still defective in the following points. Namely, the objective substance is limited to a specific metallic compound which has been made semiconductive, and special manufacturing steps are necessary for forming such semiconductive metallic compounds. Further, since it is necessary to contact the metallic compound with a solid electrode substance so as to cause discoloration, the scanning rate of a recording stylus is limited because of the friction between the solid electrode and the metallic compound. Still in addition, since a certain mechanical strength should be maintained in the solid electrode, it is impossible to minimize it beyond a certain limit. For instance, according to the above conventional technique it is impossible to discolor selectively minute areas, for example, lines having a width of several microns.

I have conducted research with a view to developing a method according to which the foregoing defects of the conventional technique can be overcome and selected minute areas of a metal compound molded to have an optional form can be discolored at a high speed owing to the change in the composition of the metallic compound. As a result, it has been found that when a laser ray is radiated on the selected areas of the surface of a molded metallic compound, discoloration is caused at said selected areas at very high speed. It has been found that in order to accelerate the discoloration at irradiation of the laser ray and make it possible to use a laser device of a lower output, it is desirable to increase the sensitivity of the metal compound to laser rays and that in order to increase the sensitivity of the metallic compound to laser rays it is preferred that semiconductivity is given to the metallic compound to be treated.

SUMMARY OF THE INVENTION

It is therefore a primary object of this invention to provide a method for discoloration of metallic compounds according to which metallic compounds can be discolored at a high speed by irradiation to a laser ray, preferably a focused laser ray.

Another object of this invention is to provide a method for discoloration of molded metallic compounds according to which preselected areas of a molded metallic compound can be selectively discolored at a high speed by applying the focused laser ray.

Still another object of this invention is to provide a method for forming images such as letters, figures, patterns, and the like in which a metallic compound is used as a material on which such image is formed by discoloration and a laser ray is employed as means causing discoloration in the metallic compound.

A further object of this invention is to provide a method for forming images on metallic compounds by discoloration of selected areas of the metallic compounds according to which the discoloration can be accomplished at a very high speed and low cost even with use of a laser device of a low output.

Other objects and advantages of this invention will be apparent from the detailed description given hereinafter.

DETAILED DESCRIPTION OF THE INVENTION

In accordance with one aspect of this invention, there is provided a method for discoloration of metallic compounds which comprises radiating a laser ray on a metallic compound selected from the group consisting of oxides, hydroxides, sulfides, carbonates, chromates and titanates of metal elements.

In accordance with another aspect of this invention, there is provided a method for discoloration of metal compounds which comprises radiating the laser ray on a metallic compound, especially a metal oxide, which has been made semiconductive.

As is seen from the foregoing explanation, the method of this invention comprises, in principle, radiating a focused laser ray on the surface of a molded article of a metallic compound such as exemplified above.

Namely, the metal compound to be discolored in the method of this invention includes oxides, hydroxides, sulfides, carbonates, chromates and titanates of metal elements. As the metal element there can be mentioned, for example, copper, silver zinc, strontium, cadmium, barium, indium, titanium, tin, lead, niobium, chromium, tungsten, iron and nickel.

For example, metallic compounds such as copper suboxide ($Cu_2O$), stannous oxide ($SnO$), chromic hydroxide ($Cr(OH)_3$), nickel sulfide ($NiS$), zinc chromate ($ZnCrO_4(OH)_2{\cdot}H_20$), strontium chromate ($SrCrO_4$), lead oxide ($PbO$), tungsten oxide ($WO_3$), ferric oxide ($Fe_2O_3$), basic nickel carbonate ($NiCO_3{\cdot}2Ni(OH)_2{\cdot}4H_2O$), barium titanate ($BaTiO_3$), zinc sulfide ($ZnS$), zinc oxide ($ZnO$), barium oxide ($BaO$), indium hydroxide ($In(OH)_3$), titanium dioxide ($TiO_2$), niobium oxide ($Nb_2O_5$), chromium oxide ($Cr_2O_3$), nickel oxide ($NiO$), and the like particularly suitable for the object of the present invention.

In the preferred embodiment of this invention, these metallic compounds are irradiated to the focused laser ray after they have been rendered semiconductive. In this preferred embodiment, it is possible to employ as the starting material any metallic compounds that can be rendered semiconductive.

For example, metallic compounds such as oxides, sulfides, chromates or titanates of a metallic element selected from copper, silver, zinc, strontium, cadmium, barium, indium, titanium, tin, lead, niobium, chromium, tungsten, iron and nickel can be rendered semiconductive. It has been found that especially good results can be obtained when metal oxides are at first rendered semiconductive and then they are exposed to the focused laser ray. As such metal oxide there can be mentioned, for example, copper suboxide ($Cu_2O$), zinc oxide ($ZnO$), titanium oxide ($TiO_2$), chromium oxide ($Cr_2O_3$), nickel oxide ($NiO$), tungsten oxide ($WO_3$), niobium oxide ($Nb_2O_5$), ferric oxide ($Fe_2O_3$), barium oxide ($BaO$), lead monoxide ($PbO$) and the like.

The kind of the laser ray to be irradiated is not particularly critical in this invention, and laser rays having a wavelength from the visible to infrared region can be used in this invention. For example, there can be employed a laser ray having a wavelength of 10.6 $\mu$ emitted from a carbon dioxide gas laser device, a laser ray having a wavelength of 6328 A emitted from a helium-neon laser device, a laser ray having a wavelength of 4579 A emitted from an argon laser device, and the like. A laser ray emitted from a solid state laser device can also be employed.

In order to increase the discoloration selectivity of areas to be discolored and heighten the discoloration rate, it is desired that a laser ray be focused by employing a suitable lens system and the irradiation is effected in the vicinity of the so formed focus. It is preferred that the energy density for the cross-section at the irradiated spot is at least 0.01 milliwatt per square micron in the case of the laser ray having a wavelength of the visible region. In the case of the laser ray having a wavelength of the infrared region, since the laser-ray-absorbing property of the metallic compound is high, it is possible to employ the laser ray having such a low energy density as 0.001 milliwatt per square micron.

It is also necessary that the metallic compound be irradiated with a laser beam with a sufficient energy dosage in order to cause discoloration. That is, at least $0.5 \times 10^{-6}$ MW sec./cm.$^2$, preferably $1.0 \times 10^{-6}$ MW sec./cm.$^2$, of energy dosage is given to the metallic compound to cause distinct discoloration on the surface of it.

On the other hand, an excessively large energy dosage in some instances may cause an emission of a flame due to the evaporation of the metallic compound and in an extreme case grooving of the surface of it occurs so that the discoloration of it is obscured and no sharp image can be obtained. Therefore, an energy dosage having an upper limit of $3.0 \times 10^{-3}$ MW sec./cm.$^2$, preferably $1.0 \times 10^{-3}$ MW sec./cm.$^2$, is given to the metallic compound by laser irradiation.

As mentioned above, if the metallic compound, especially the metal oxide, to be discolored is rendered semiconductive in advance, the sensitivity of the metallic compound is much enhanced. In such case, it is possible to employ the laser ray of at least 0.001 milliwatt per square micron regardless of whether it has a wavelength of the visible region or of the infrared region. In this embodiment, the discoloration can be accomplished effectively with use of a laser device of a relatively low output.

In this preferred embodiment, the metallic compound, especially the metal oxide such as mentioned above, is made semiconductive in advance. Formation of such semi-conductive metallic compounds can be accomplished by a method comprising absorbing oxygen excessively in a metallic compound and a method comprising doping a hetero element in a metallic compound. The absorption of excessive oxygen can be performed by heating a metallic compound is oxygen and cooling it rapidly. The doping of a hetero element can be performed by a method comprising co-precipitating a solid metallic compound from a solution of the metallic compound in which a compound of the hetero element to be doped is co-present, and calcining the precipitated solid compound to convert it to an oxide or by a method comprising mixing a solid compound of the hetero element to be doped, directly into the starting metallic compound or wetting the starting metallic compound with a solution of a compound of the hetero element to be doped, and calcining the resulting mixture. In this case, excessive oxygen is incorporated in the metallic compound in an amount of 0.1 to 2% by weight or the hetero element is doped in the metallic compound in an amount of 0.01 to 10 mole %.

The starting metallic compound or semiconductive metallic compound can be singly molded by solidification or sintering. It can be mixed with a small amount of a binder, kneaded sufficiently and molded into a film or sheet. It can also be molded into an image-forming sheet by coating such mixture of the starting metallic compound or semiconductive metallic compound with a small amount of a binder on a substrate such as a plastic film.

Thickness of the target material is not critical because the object of the invention is to discolor the surface of said material by laser irradiation.

In this invention, it is construed that the change in the composition of the metallic compound is caused under radiation of a laser ray and this change of the composition results in discoloration at the irradiated areas of the metallic compound. However, it has not been completely elucidated what change of the composition is brought about under radiation of the laser ray. But it may be considered that when a metallic compound is irradiated to a focused laser ray having a high density energy, bound components of the metallic compound are dissociated at the irradiated areas and they are cooled for a very instant before oxygen in air is substantially diffused and reaches them, as the result that the metallic component is left at the irradiated areas in the form of a compound of a lower valency or in the free metal state. It may also be construed that the so formed free metal undergoes secondary oxidation with air and is present at the irradiated areas in the form of a metallic compound different from the original starting metallic compound.

When the composition of the metallic compound is thus changed by radiation of the laser ray, this change of the composition results in the change of color at the irradiated areas. The degree of this color change varies to some extent depending on the kind of the metallic compound to be irradiated. In case a compound which exhibits a high degree of discoloration is employed, the areas irradiated can be clearly observed by naked eyes. Therefore, an image can be formed by employing the method of this invention. More specifically, when a dispersion of the metallic compound in a suitable binder is coated on the surface of a plastic film or the like and the laser ray is radiated and scanned on the surface of the so formed layer of the metallic compound intermittently or while changing the intensity of the laser ray depending on an image to be formed, the desired image can be formed or reproduced. This technique for formation of images can be employed not only for the recording purpose, but also for printing or formation of electric circuits while utilizing changes in other properties than the color hue at the irradiated areas.

The wavelength and intensity of the laser ray and the beam diameter at the focus were as shown in Table 1.

Table 1

| Laser Device | Wavelength (A) | Beam Output (mW) | Focus Diameter (μ) | Surface Power Density (MW/cm²) | Maximum Energy Dose* MW sec/cm²) | Scanning Rate (cm/sec) |
|---|---|---|---|---|---|---|
| Helium-neon (He-Ne) | 6328 | 30 | 50 | 0.00153 | $2.6 \times 10^{-6}$ | 3 |
| Argon (Ar) | 5145 | 310 | 2 | 9.867 | $6.6 \times 10^{-4}$ | 3 |
| " | 4880 | 280 | 2 | 8.912 | $5.9 \times 10^{-4}$ | 3 |
| " | 4579 | 63 | 2 | 2.005 | $1.3 \times 10^{-4}$ | 3 |

*(This is the energy dose at the center line of the loci of irradiation in the direction of scanning).

As is seen from the foregoing explanation, one of the characteristic features of this invention resides in that selected minute portions of the surface of a molded metallic compound can be selectively discolored. In the case of conventional photosensitive materials including a silver halide compound, there are many disadvantages. For example, such photosensitive material should be treated in the dark, and it is difficult to obtain a visible image only by light exposure and it is necessary to conduct such post treatment as development and fixation treatments. According to this invention, none of such disadvantages are brought about. More specifically, the starting metal compound need not be treated in the dark but can be treated in an ordinary room, and a visible image can be formed directly by radiation of a laser ray. Further, the metallic compound to be used in this invention is not so expensive as the silver halide photosensitive material, and from the economical viewpoint the method of this invention is very advantageous. Furthermore, since in the method of this invention application of an electric current to the metallic compound need not be effected and it need not be contacted with a solid electrode or the like, the image-forming rate can be greatly enhanced.

Especially when the starting metallic compound is rendered semiconductive in advance according to the preferred embodiment of this invention, the strain is formed in the crystal lattice to increase the activity of the metallic compound and discoloration can be achieved by using a laser ray having a relatively low energy density and hence an image can readily be formed on the surface of such semiconductive metallic compound used as the image-forming material.

This invention will now be illustrated in more detail by reference to examples which by no means are intended to limit the scope of this invention.

EXAMPLE 1

An epoxy resin varnish was coated on a small piece of a polyester sheet having a thickness of 0.2 mm., and while the coated varnish was still sticky, a powdery metallic compound indicated in Tables 2 to 5 given below was scattered on the coated surface and the scattered compound was pressed by means of a roller to thereby form a layer of the metallic compound having a smooth surface and a thickness of about 0.3 mm. Then, the varnish component was solidified to obtain a sample sheet.

Each of the so obtained sample sheets was passed at a rate of about 3 cm. per second through the focus point of a focused laser beam emitted from a helium-neon laser device, or argon laser device, while holding the metal compound-applied surface of the sample vertically to the beam direction.

With respect to each of the foregoing laser beams, the irradiation effects on each of tested metal compounds were evaluated to obtain results shown in Tables 2 to 5. As is seen from these results, in each case it was observed that a fine line of a color different from the original color before irradiation was formed along the locus of the irradiation.

Table 2

| Metallic Compound | | | Color on Irradiation Locus | | | |
|---|---|---|---|---|---|---|
| Name | Chemical Formula | Color | He-Ne 6328 A | Ar 5145 A | Ar 4880 A | Ar 4579 A |
| copper suboxide | $Cu_2O$ | reddish brown | black | black | black | black |
| stannous oxide | SnO | black | white | white | white | white |
| chromium hydroxide | $Cr(OH)_3$ | greyish blue | black | black | black | black |
| nickel sulfide | NiS | black | white | white | white | white |

Table 3

| Metallic Compound | | | Color on Irradiation Locus | | |
|---|---|---|---|---|---|
| Name | Chemical Formula | Color | Ar 5145 A | Ar 4880 A | Ar 4579 A |
| zinc chromate | $ZnCrO_4(OH)_2 . H_2O$ | yellow | black | black | black |
| strontium chromate | $SrCrO_4$ | yellow | black | black | black |
| lead oxide | PbO | yellow | black | black | black |
| tungsten oxide | $WO_3$ | yellow | greyish brown | black | black |
| ferric oxide | $Fe_2O_3$ | reddish brown | black | black | black |
| basic nickel carbonate | $NiCO_3 . 2Ni(OH)_2 . 4H_2O$ | light green | black | black | black |

Table 4

| Metallic Compound | | | Color on Irradiation Locus | |
|---|---|---|---|---|
| Name | Chemical Formula | Color | Ar 4880 A | Ar 4579 A |
| barium titanate | $BaTiO_3$ | white | black | grey |
| zinc sulfide | ZnS | light yellow | black | grey |
| zinc oxide | ZnO | white | grey | greyish white |

Table 5

| Metallic Compound | | | Color on Irradiation Locus |
|---|---|---|---|
| Name | Chemical Formula | Color | Ar 4880 A |
| barium oxide | BaO | white | black |
| indium hydroxide | $In(OH)_3$ | white | black |
| titanium oxide | $TiO_2$ | white | blackish brown |

Table 5-continued

| Metallic Compound | | | Color on Irradiation Locus |
|---|---|---|---|
| Name | Chemical Formula | Color | Ar 4880 A |
| niobium oxide | $Nb_2O_3$ | white | black |
| chromium oxide | $Cr_2O_3$ | green | greyish black |
| nickel oxide | NiO | yellowish green | grey |

EXAMPLE 2

Zinc oxide powder for paint use was wetted and kneaded with ethyl alcohol, and the mixture was molded into a flat plate. Then, the ethyl alcohol was evaporated and the zinc oxide powder was solidified to obtain a sample plate. This sample was irradiated to a laser beam of a focus diameter of about 1 mm., which had a wavelength of 10.6 microns and emitted from a carbon dioxide laser device of a beam output of 1 watt. The color was changed to greyish brown at the irradiated area of the sample.

EXAMPLE 3

500 g. of titanium oxide of the anatase type for paint use, 40 g. of Versamid (trademark for polyamide resin manufactured by General Mills Inc., U.S.A.), 150 g. of isopropyl alcohol and 150 g. of toluene were charged into a porcelain ball mill, and the mixture was rotated and dispersed for 20 hours. Then, 60 g. of Epikote 1004 (trademark for epoxy resin manufactured by Shell Chemical Co.) dissolved in a mixed solvent of 192 g. of methylethylketone and 48 g. of cellosolve acetate ethyleneglycol monoethyl ether acetate were added to the mixture and the ball mill was operated for several minutes to form a homogeneous mixture. Thus was prepared a recording layer-forming composition.

This composition was coated on one surface of a polyester film having a thickness of 100 $\mu$ and the solvent was evaporated. Then, the coated film was heated at 60° C. for 30 minutes to effect curing. Thus was obtained a laser recording sheet having a titanium oxide layer having a thickness of 25 $\mu$.

This recording sheet was wound on a rotary cylinder having a diameter of 5 cm. and the cylinder was rotated at 12 rpm and was slid also to the axial direction of rotation. A laser beam of a wavelength of 4880 A was radiated thereto using the same argon laser device as employed in Example 1. During the operation, the radiation of the laser beam was interrupted by driving a rotary vane disposed between the beam source and the rotary cylinder. Clear dotted or broken lines were formed on the surface of the titanium oxide layer.

EXAMPLE 4

Nickel oxide (NiO, reagent grade) was heated at 900° C. in a porcelain crucible using an electric furnace while introducing oxygen gas in the crucible, and then it was cooled rapidly. The so formed semiconductive nickel was molded into a pellet which was found to have a conductivity of about $2 \times 10^4$ $ohm^{-1} \cdot ch^{-1}$. The pellet was applied on the surface of a plastic plate on which an adhesive was coated, and then it was pressed by means of a roller to obtain a sample plate having a conductive nickel oxide layer of a thickness of about 200 $\mu$ (designated as "sample 1"). The above procedures were repeated by employing untreated nickel oxide (without rendering it semiconductive) to obtain a sample having a nickel oxide layer of a thickness of about 200 82 (designated as "sample 2").

A laser beam having a wavelength of 4880 A and a beam output of 280 milliwatts or a laser beam having a wavelength of 4579 A and a beam output of 63 milliwatts, emitted from an argon laser device, was radiated on the oxide layer of each of the so obtained samples. During irradiation, the sample was passed through the focus of the laser beam (the focus diameter being 2 $\mu$ in each case) at a rate of about 3 cm. per second in the direction vertical to the irradiation direction.

As a result, it was found that in the case of the sample 2 having an untreated nickel oxide layer, discoloration was not caused by the laser ray having a wavelength of 4579 A but the irradiated area was colored in grey only by the laser ray having a wavelength of 4880 A. In contrast, in the case of the sample 1 having a semiconductive nickel oxide layer, the irradiated area was colored in light grey by the laser ray of a wavelength having 4579 A and in greyish black by the laser ray having a wavelength of 4880 A.

EXAMPLE 5

1 Kg. of zinc oxide (reagent of the special grade) was added to a solution of 900 mg. of aluminum nitrate, $Al(NO_3)_3 \cdot 9H_2O$, in 1.2 l. of ethanol to form a homogeneous slurry. Excessive ethanol was removed from the slurry by filtration, and the residue was dried at 110° C. to form a massive agglomerate. The resulting massive agglomerate was finely divided into particles having a size of about 1 $\mu$. Coarser particles were removed by sieving, and the remaining particles having a size of about 1 $\mu$ or less were calcined in air at 1,100° C. for 1 hour to obtain a powdery semiconductor of zinc oxide. The powdery semiconductor was press molded into a pellet which was found to have a volume resistivity of $5.3 \times 10^3$ ohm·cm.

With use of the so treated semiconductive zinc oxide, a layer having a thickness of about 200 $\mu$ was formed on one surface of a plastic plate in the same manner as described in Example 4 (designated as "sample 3"). Similarly, layer having a thickness of about 200 $\mu$ was formed on the surface of a plastic plate with use of untreated zinc oxide (designated as "sample 4").

A laser ray having a wavelength of 4880 A was radiated on each of samples 3 and 4 under the same conditions with use of the same laser device as in Example 4. the irradiated area was colored into grey in the case of sample 4, but in the case of sample 3 having a semiconductive zinc oxide layer, the irradiated area was colored into black.

EXAMPLE 6

6.6 g. of niobium oxide ($Nb_2O_5$) was added to 1 Kg. of titanium oxide ($TiO_2$, reagent of the first grade) and they were uniformly mixed. The resulting mixture was calcined at 1200° C. in air for 1.5 hours with use of an electric furnace to form semiconductive titanium oxide. A pellet formed by press molding the so obtained semiconductive titanium oxide was found to have a volume resistivity of $3.2 \times 10^4$ ohm·cm.

An acrylic resin solution in an amount of 80 g. as calculated as the solid was added to 240 g. of the so obtained semiconductive zinc oxide and the mixture was sufficiently dispersed in a ball mill to obtain a coating composition. The composition was coated on one surface of a polyester film having a thickness of 75

μ and dried to form a semiconductive titanium oxide layer having a thickness of about 25 μ on the polyester film (designated as "sample 5").

The above procedures were repeated with use of 420 g. of untreated titanium dioxide to obtain a sample having a titanium oxide layer having a thickness of about 25 μ (designated as "sample 6").

A laser ray having a wavelength of 4880 A and an output of 280 milliwatts or a laser ray having a wavelength of 5145 A and an output of 310 milliwatts (the focus diameter being 2 μ in each case) was radiated on each of the samples 5 and 6 with use of the same argon laser device as employed in Example 4 while maintaining the moving speed of the sample at 5 cm. per second. In the case of the sample 6 having an untreated titanium oxide layer, an image line of a blackish brown color was formed only by irradiation of the laser ray having a wavelength of 4880 A. In contrast, in the case of the sample 5 having a semiconductive titanium oxide layer, an image line of a black color was formed by each of the irradiated laser rays. Further, in the case of the sample 5, the degree of coloration was extremely high, and the image line had a deep black color and was very clear.

When a layer ray having a wavelength of 4880 A was radiated while maintaining the sample moving speed at 10 cm. per second, in the case of the sample 6 having an untreated titanium oxide layer no colored image line was formed, but in the case of the sample 5 having a semiconductive titanium oxide layer, a black image line was similarly formed.

Data for these illustrations are given in Table 6.

Table 6

| Laser Ray | Power (mW) | Diameter of Focus (μ) | Surface Energy Density ($MW/cm^2$) | Scanning Rate (cm/sec) | Maximum Dosage (Mw sec/$cm^2$) |
|---|---|---|---|---|---|
| Ar 5145A | 310 | 2 | 9.867 | 5 | $3.9 \times 10^{-4}$ |
| Ar 4880A | 280 | 2 | 8.912 | 5 | $3.6 \times 10^{-4}$ |
| Ar 4880A | 280 | 2 | 8.912 | 10 | $1.8 \times 10^{-4}$ |

I claim:

1. A method of discoloration of a metal compound to form a compound in which the metal has a lower valence or to deposit the metal which comprises rendering semiconductive a metallic compound selected from the group consisting of oxides, sulfides, chromates and titanates of metal elements, and radiating a laser ray on the resulting semiconductive metallic compound, said laser ray having a wavelength from the visible region to the infrared region and an energy density of at least 0.001 milliwatt per square micron for the cross-section at an irradiated spot of said semiconductive metallic compound, the energy dosage being from $0.5 \times 10^{-6}$ MW sec./cm.$^2$ to $3.0 \times 10^{-3}$ MW sec./cm.$^2$.

2. A method according to claim 1, wherein the metallic compound is a metallic oxide selected from the group consisting of copper suboxide, zinc oxide, titanium oxide, chromium oxide, nickel oxide, tungsten oxide, niobium oxide, ferric oxide, barium oxide, and lead monoxide.

3. A method according to claim 2, wherein the metallic oxide is rendered semiconductive by absorbing excessive oxygen into the metallic oxide.

4. A method according to claim 3, wherein excessive oxygen is absorbed in metallic oxide in an amount of 0.1 to 2% by weight.

5. A method according to claim 2, wherein the metallic oxide is rendered semiconductive by doping a hetero element into the metallic oxide.

6. A method according to claim 5, wherein the hetero element is doped in the metallic oxide in an amount of 0.01 to 10 mole %.

7. A method according to claim 1, wherein radiation of the laser ray is conducted with use of a carbon dioxide gas laser device or a helium-neon laser device.

8. A method according to claim 1, wherein said energy dosage is from $1.0 \times 10^{-6}$ MW sec./cm.$^2$ to $1.0 \times 10^{-3}$ MW sec./cm.$^2$.

9. A method according to claim 1, wherein the metal of said metal compound is reduced to lower valence.

* * * * *

UNITED STATES PATENT OFFICE

CERTIFICATE OF CORRECTION

Patent No. 4,001,095 Dated January 4, 1977

Inventor(s) Eisaku Nakatani

It is certified that error appears in the above-identified patent and that said Letters Patent are hereby corrected as shown below:

Column 6, Table 1, in the heading: under "Focus Diameter" " (")" should read -- ($\mu$) --.

Column 8, line 3, "82" should read --$\mu$--.

Column 8, line 49, "the" (first occurrence) should read -- The --.

Column 7, line 61, after "nickel", insert -- oxide --.

Column 7, line 62, "$ohm^{-1}ch^{-1}$" should read -- ohm.cm --.

Signed and Sealed this

*Seventh* Day of *March 1978*

[SEAL]

*Attest:*

RUTH C. MASON
*Attesting Officer*

LUTRELLE F. PARKER
*Acting Commissioner of Patents and Trademarks*